United States Patent [19]

Lubinsky et al.

[11] Patent Number: 4,762,998

[45] Date of Patent: Aug. 9, 1988

[54] METHOD FOR READING OUT AN IMAGE SIGNAL STORED IN A TRANSPARENT PHOTOSTIMULABLE PHOSPHOR

[75] Inventors: Anthony R. Lubinsky, Webster; James F. Owen, Rochester; Donald M. Korn, Penfield, all of N.Y.

[73] Assignee: Eastman Kodak Company, Rochester, N.Y.

[21] Appl. No.: 48,709

[22] Filed: May 12, 1987

[51] Int. Cl.4 ............................................... G03C 5/16
[52] U.S. Cl. ................................................. 250/327.2
[58] Field of Search ......................... 250/327.2, 484.1

[56] References Cited

U.S. PATENT DOCUMENTS

Re. 31,847  3/1985  Luckey ........................... 250/327.2
4,507,562  3/1985  Gasiot et al. ...................... 250/484.1

FOREIGN PATENT DOCUMENTS 1175647  10/1984  Canada .

OTHER PUBLICATIONS

The Resolving-Power Functions and Quantum Processes of Television Cameras, RCA Review, Sep. 1967, pp. 487 et seq. (Schade).

Laser-Stimulable Transparent CsI:Na Film for High Quality X-Ray Imaging Sensor, by Tsuyoshi Kano et al., Appl. Phys. Lett., Apr. 28, 1986.

*Primary Examiner*—Carolyn E. Fields
*Attorney, Agent, or Firm*—Thomas H. Close

[57] ABSTRACT

An image recorded by a photostimulable phosphor image recording medium that is transparent (i.e. substantially non-scattering) to stimulating radiation is read out by scanning the stimulable phosphor with a beam of stimulating radiation of such power and at such a speed effective to completely discharge the photostimulable phosphor in a fraction of the beam spot diameter in the scanning direction, whereby the effective size of the scanning spot is smaller than the beam spot diameter, thereby increasing the resolution of the image signal in the scanning direction.

4 Claims, 13 Drawing Sheets

FIG. 1

$$\eta = \frac{a P_o}{\sigma_y \tau}$$

PSF, Low exposure
*FIG. 5*

PSF, Medium exposure
*FIG. 6*

PSF, High exposure
FIG. 7

PSF, Very high exposure
FIG. 8

METHOD FOR READING OUT AN IMAGE SIGNAL STORED IN A TRANSPARENT PHOTOSTIMULABLE PHOSPHOR

TECHNICAL FIELD

The present invention relates to reading out the image stored in an photostimulable phosphor, and more particularly to reading out the image from a photostimulable phosphor that is transparent to stimulating radiation.

BACKGROUND ART

In a photostimulable phosphor imaging system, as described in U.S. Pat. No. RE 31,847 reissued Mar. 12, 1985 to Luckey, a photostimulable phosphor sheet is exposed to an imagewise pattern of high energy, short wavelength radiation, such as x-radiation, to record a latent image pattern in the photostimulable phosphor sheet. The latent image is read out by stimulating the phosphor with a relatively long wavelength stimulating radiation, such as red or infrared light. Upon stimulation, the photostimulable phosphor destructively releases emitted radiation of an intermediate wavelength, such as blue or violet light, in proportion to the quantity of short wavelength radiation that was received. The term "destructively" is used herein to denote that the photostimulable phosphor is discharged by the stimulating light, and that only a finite amount of stimulated radiation is emitted by the phosphor, regardless of the quantity of stimulating radiation applied. The term "photostimulable phosphor" as used herein, refers to phosphors that destructively release emitted radiation. To produce a signal useful in electronic image processing, the photostimulable phosphor sheet is scanned in a raster pattern by a beam of light produced, for example, by a laser deflected by an oscillating or rotating scanning mirror. The emitted radiation is sensed by a photodetector such as a photomultiplier tube to produce the electronic signal.

Figure 2:
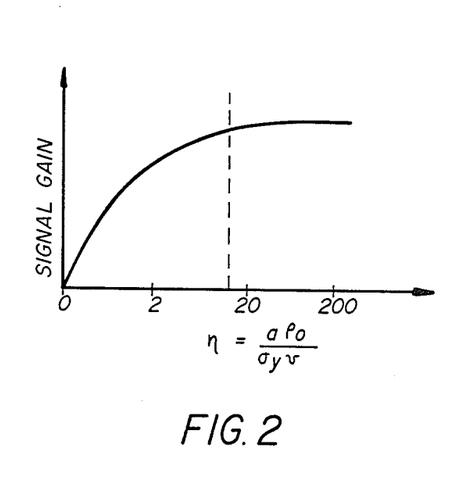
FIG. 2 is a qualitative plot of signal gain versus exposure for a photostimulable phosphor.

In the conventional photostimulable phosphor imaging system, the photostimulable phosphor sheet is turbid (i.e. scattering) to both stimulating and emitted wavelengths of light. The resolution of such a system is determined to a large extent by the degree to which the laser beam scatters (spreads) within the screen, Hence, in general, a thicker turbid screen will result in a lower system resolution than a corresponding thinner screen. Furthermore, in such a turbid phosphor system, the minimum effective stimulating beam size that can be achieved, and hence the maximum resolution of the system is inversely related to the signal gain. The signal gain cannot be made too small without limiting the signal-to-noise ratio achievable by the system. In the turbid phosphor system, if the stimulating beam power is increased to increase the gain (i.e. the strength of the signal recovered from the photostimulable phosphor), the effective stimulating beam size increases due to scattering of the stimulating beam in the turbid phosphor. FIG. 2 is a plot of the signal gain versus exposure for a photostimulable phosphor imaging panel. The exposure $\eta$ is directly proportional to the scanning beam power $P_o$ and inversely proportional to the scanning beam velocity v. As shown in FIG. 2, as the exposure increases, the signal increases until the system saturates, i.e. all of the available signal is read out of the photostimulable phosphor. Due to the interrelation between beam power and effective beam size, conventional turbid phosphor imaging systems are sometimes operated in the rising part of the curve to maximize the resolution of the system.

It has been proposed that the resolution of a photostimulable phosphor imaging system may be greatly improved by making the photostimulable phosphor sheet transparent to stimulating radiation, thereby decoupling the effective beam size from the phosphor thickness and hence allowing a maximum resolution that is determined solely by the actual scanning beam size. The term "transparent" as used herein means substantially non-scattering to stimulating radiation. See Canadian Pat. No. 1,175,647 issued Oct. 9, 1984 to DeBoer and Luckey. The object of the present invention is to further improve the resolution of transparent photostimulable phosphor imaging systems of the destructive read-out type.

DISCLOSURE OF THE INVENTION

According to the invention, a method for reading out the image stored in a transparent photostimulable phosphor is characterized by scanning the photostimulable phosphor with a beam of stimulating radiation at a beam power and beam scanning speed effective to completely discharge the photostimulable phosphor in a fraction of the beam spot diameter in the direction of scanning, whereby the effective size of the scanning spot is smaller than the beam spot diameter, thereby increasing the resolution of the image signal in the scan direction.

In the preferred mode of practicing the invention, the photostimulable phosphor is scanned in a raster pattern at a pitch p and the beam having a gaussian profile with a width $\sigma_y$ in the slow scan direction, and wherein the ratio of $\sigma_y$ to the pitch p is in the range of 0.2 to 0.3.

To further increase the resolution of the image signal in the fast scan direction without adversely affecting the resolution in the slow scan direction for a given raster pitch, the gaussian scanning beam intensity profile is preferably elliptical with the short axis of the ellipse aligned in the fast scan direction.

MODES OF CARRYING OUT THE INVENTION

Figure 1:
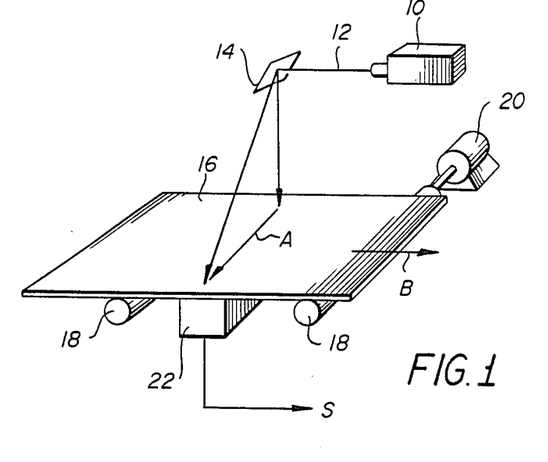
FIG. 1 is a schematic perspective view of photostimulable phosphor read out apparatus useful according to the present invention.

Referring now to FIG. 1, photostimulable phosphor scanning apparatus useful for practicing the present invention will be described. The scanning apparatus includes a laser 10 for producing a scanning beam 12. The scanning beam is deflected in a first or line scan direction (as indicated by arrow A) by means such as a scanning mirror 14, to scan a line across a transparent photostimulable phosphor sheet 16. The transparent photostimulable phosphor sheet is transported in a slow or page scan direction (as indicated by arrow B) by transport means such as rollers 18 driven by a motor 20. Light emitted from the transparent photostimulable phosphor sheet 16 is collected and detected by a light collector 22. Preferably, the light collector 22 is of the type described in copending U.S. patent application Ser. No. 048,710, filed May 12, 1987 by Kulpinski et al., which includes means for making optical contact with the transparent photostimulable phosphor sheet to thereby increase the light collection efficiency of the collector. The light collector 22 produces an electronic signal S representing the image that is read out of the transparent photostimulable phosphor sheet 16.

Figure 3:
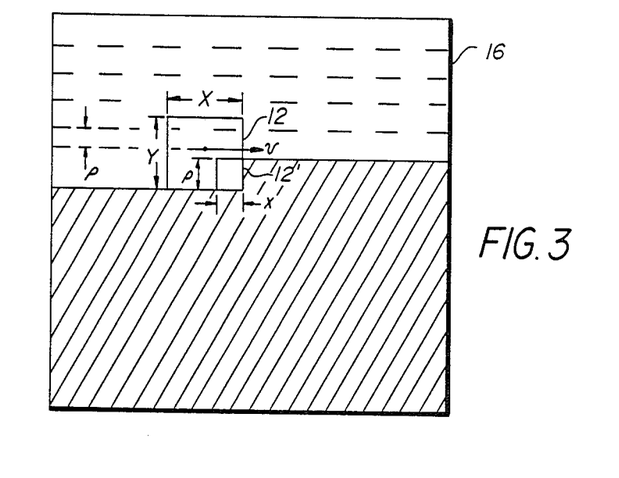
FIG. 3 is a qualitative schematic diagram useful in describing beam self-sharpening according to the present invention.

As the exposure of the photostimulable phosphor sheet is increased, by increasing the beam power of decreasing the velocity of the scan, the output signal gain rises initially, then levels off as a maximum effective exposure is achieved. This effect is plotted in FIG. 2, where the exposure $\eta$ is plotted versus signal gain. The exposure $\eta$ is directly proportional to the scanning beam power $P_o$ and inversely proportional to the scanning velocity v. However, as the exposure $\eta$ is increased above the maximum effective exposure, indicated by the dotted line in FIG. 2, the resolution of the signal S in the scanning direction improves. This improvement in resolution is attributed to the phenomenon of "beam self-sharpening" whereby the transparent photostimulable phosphor sheet is completely discharged in less than the diameter of the stimulating beam in the scanning direction. As a result, the apparent beam diameter of the stimulating beam is less than the actual diameter, thereby increasing the resolution of the signal S. Although there is a complex interaction between the beam self-sharpening effect in the fast scan direction and the resolution in the slow scan direction, as will be explained in more detail below, the self-sharpening effect can be qualitatively appreciated with reference to FIG. 3. In FIG. 3, a transparent photostimulable phosphor sheet 16 is scanned by a beam 12 having a rectangular cross section with the dimensions X,Y. The beam is moved in a fast scan direction at a velocity v. The scan lines are advanced in the slow scan direction by a pitch p. The dotted lines indicate the positions of previous scan lines. The cross hatch region indicates the area of the phosphor sheet that has not been read out. The laser power is such that the phosphor sheet is completely discharged by the time that the beam has traveled a distance x in the fast scan direction. As a result, the effective size of the scanning beam is x by p, as illustrated by the rectangle labeled 12' in FIG. 3. As noted above, there is a complex interaction between the effective beam size in the fast and slow scan directions. This relation will be described in a more quantitative way in what follows.

Two-Dimensional Scanning Model

An integral equation for modeling two-dimensional destructive scanning can be stated as follows.

Let:

$$E(x,y,t) = \int_{-\infty}^{t} I(x,y,\tau)d\tau, \quad (1)$$

where $E(x,y,t)$ is the cumulative exposure of stimulating light received at a position (x,y) up to time t; and $I(x,y,\tau)$ is the intensity of the stimulating light beam as a function of position and time.

Assume that the reduction in latent image is expressed in terms of the cumulative exposure $E(x,y,t)$ by:

$$H(x,y,t) = H(x,y,o) \exp[-a \cdot E(x,y,t)], \quad (2)$$

where $H(x,y,t)$ measures the latent image remaining at position x,y at time t; and a is a material related parameter associated with the particular photostimulable phosphor storage medium.

The parameter a is determined by experiment as follows. A photostimulable phosphor sample is first given a known x-ray exposure. It is then illuminated with a stationary source of stimulating light. The resulting photostimulable light is collected, filtered, and detected with, e.g. a photomultiplier tube. The detected signal is observed to decay with time. The amount of stimulating light exposure necessary to cause the signal to decay to 1/e of its initial value is equal to 1/a. The light flux F created at point x,y at time t is the negative rate of change of the latent image $H(x,y,t)$ at time t defined as follows:

$$F(x,y,t) = -\frac{\partial H(x,y,t)}{\partial t}. \quad (3)$$

The total emitted flux S(t) is the space integral of $F(x,y,t)$:

$$S(t) = \int\int F(x,y,t)dxdy. \quad (4)$$

Combining equations (1), (2), (3), and (4) the total emitted flux (signal) S(t) in terms of the latent image and the scanning light intensity $I(x,y,t)$ is:

$$S(t) = a\int\int dxdy\, H(x,y,0) \exp\left[-a\int_{-\infty}^{t} I(x,y,\tau)d\tau\right] I(x,y,t) \quad (5)$$

Equation (5) is an integral equation for the emitted flux signal S(t) in terms of the scanning intensity $I(x,y,t)$. In the following, the present invention will be described with reference to some solutions of equation (5).

Scanning with a Square Beam Profile

Figure 4A:
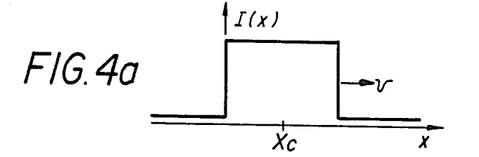
FIGS. 4a-d are graphs of physical quantities useful in describing the "effective beam" size.

Assuming an idealized beam that has a rectangular intensity profile in the fast scan direction x, the various terms appearing under the integral sign in equation (5) can be visualized as follows:

FIG. 4a shows the beam intensity profile I(x) at a particular time t and position $x_c$.

Figure 4B:
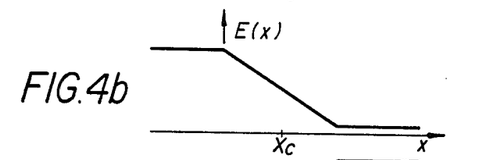

FIG. 4b shows the cumulative exposure E(x) versus position x.

Figure 4C:
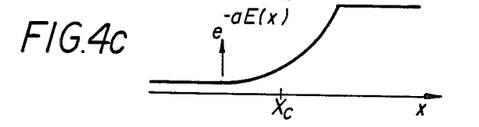

FIG. 4c shows the exponential factor in parenthesis in equation (5). This will be called the pre-exposure factor.

Figure 4D:
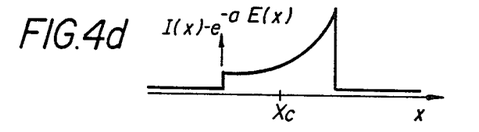

FIG. 4d shows the product of the intensity and the pre-exposure factor. It is this product (times a) that is convolved with the latent image H to produce the signal S(t) and for this reason this product is called the "effective beam". In FIG. 4d it can be seen that the leading edge of the effective beam is weighted more heavily than the trailing edge due to the effects of pre-exposure. Thus, the effective width of the scanning beam may be narrower than its nominal width. The strength of this effect depends on the beam intensity. Thus, the spatial frequency response in the scanning direction depends on the beam intensity as well as the nominal beam width. This is shown analytically be considering the Fourier transform of the effective beam profile. For scanning in one dimension with a rectangular beam, the Fourier transform $T(\nu)$ of the effective beam profile is $$T(\nu) = a\, I_o \sigma e^{-aE/2} \left[ \frac{\sin(\pi\nu\sigma - iaE/2)}{\pi\nu\sigma - iaE/2} \right], \quad (6)$$

where
$T(\nu)$ is the Fourier transform (i.e. the spatial frequency transfer function);
$\nu$ is the spatial frequency;
$I_o$ is the beam intensity (energy/cm-sec);
$\sigma$ is the beam width;
a is the material parameter as described above;
E is the exposure ($I_o\sigma/v$); and
v is the scanning velocity.

The effects of pre-exposure on the frequency response $T(\nu)$ is reflected in the imaginary terms in equation (6). When $aE \gg 1$ these effects are large.

Scanning With a Gaussian Beam Profile

Turning now to an example of more practical interest, the case of a beam of stimulating radiation having a gaussian profile such as would be produced by a laser beam will be considered. The intensity profile of the gaussian scanning beam with its center at $(x_b, y_b)$ is $$I(x_b - x, y_b - y) = \qquad (7)$$

$$\frac{P_o}{2\pi\sigma_x\sigma_y} \exp\left[\frac{-(x_b-x)^2}{2\sigma_x^2}\right] \exp\left[\frac{-(y_b-y)^2}{2\sigma_y^2}\right]$$

where
$P_o$ is the power of the beam and
$\sigma_x, \sigma_y$ are the standard deviations of the gaussian profile in the fast-scan (x) direction and slow scan (y) direction respectively.

For a raster scan, the intensity is integrated to yield an exposure as follows:

$$E(x,y,t) = \qquad (8)$$

$$\frac{1}{v} \sum_{n=\infty}^{i+1} \int_{-\infty}^{\infty} \left(\frac{P_o}{2\pi\sigma_x\sigma_y}\right) e(x_b - x) e(y_n - y) dx_b +$$

$$\frac{1}{v} \int_{-\infty}^{x_i} \left(\frac{P_o}{2\pi\sigma_x\sigma_y}\right) e(x_b - x) e(y_i - y) dx_b$$

where $$e(x_b - x) = \exp\left[\frac{-(x_b - x)^2}{2\sigma_x^2}\right],$$

$$e(y_n - y) = \exp\left[\frac{-(y_n - y)^2}{2\sigma_y^2}\right],$$

$y_i$ represents the center of the $i^{th}$ scan line,
v is the velocity of the scanning beam.
Now, since $$\int_{-\infty}^{\infty} e(x_b - x) dx_b = \sqrt{2\pi}\, \sigma_x,$$

equation (8) becomes $$vE(x,y,t) = \frac{P_o}{\sqrt{2\pi}\, \sigma_y v} \sum_n^{i+1} (y_n - y) + \frac{P_o}{2\pi\sigma_x\sigma_y} e(y_i - y) \qquad (9)$$

$$\int_{-\infty}^{x_i} e(x_b - x) dx_b$$

also since $$\int_{-\infty}^{x_i} e(x_b - x) dx_b = \frac{\sqrt{2\pi}\, \sigma_x}{2}\left[ erf\left(\frac{x_i - x}{\sqrt{2}\,\sigma_x}\right) + 1 \right]$$

equation (9) becomes $$E(x,y,t) = \frac{P_o}{\sqrt{2\pi}\, \sigma_y v} \left\{ \sum_n^{i+1} e(y_n - y) + \frac{e(y_i - y)}{2}\left[ erf\left(\frac{x_i - x}{\sqrt{2}\,\sigma_x}\right) + 1 \right] \right\} \qquad (10)$$

Write:

$$E(x,y,t) = E_1(y_i - y) + E_2(x_i - x, y_i - y);$$

and define:

$$R(y_i - y) = \exp[-aE_1], \text{ and} \qquad (11)$$

$$P(x_i - x, y_i - y) = \exp[-aE_2]. \qquad (12)$$

Physically, $E_1$ and $E_2$ are the exposures resulting from all previously completed scan lines, and from the current scan line up to time t, respectively. Similarly, R and P are the pre-exposure factors resulting from previously completed scan lines and from the current scan line respectively. Explicitly, R and P are:

$$R(y_i - y) = \exp\left\{ \frac{-aP_o}{\sigma_y^\nu} \frac{1}{\sqrt{2\pi}} \sum_{n=a}^{i+1} e(y_n - y) \right\}, \quad (13)$$

and $$P(x_i - x, y_i - y) = \exp\left\{ \frac{-aP_o}{\sigma_y^\nu} \frac{1}{\sqrt{2\pi}} e(y_i - y) \left[ \frac{1}{2} erf\left( \frac{x_i - x}{\sqrt{2}\, \sigma_x} \right) + \frac{1}{2} \right] \right\}. \quad (14)$$

With R and P as defined above, the expression for the scanning signal becomes:

$$S(t) = S(x_i, y_i) = a \int\int dx dy H(x,y,0)x \quad (15)$$

$$R(y_i - y)P(x_i - x, y_i - y)I(x_i - x, y_i - y),$$

where
H(x,y,0) is the initial latent image stored in the phosphor.
Define:

$$G(x_i - x, y_i - y) = aR(x_i - x)P(x_i - x, y_i - y)I(x_i - x, y_i - y) \quad (16)$$

where
G is the two-dimensional, gaussian generalization of the "effective scanning beam" discussed above. it is seen that:

$$S(x_i, y_i) = \int\int dx dy H(x,y,0) G(x_i - x, y_i - y) \quad (17)$$

is a two dimensional convolution formula for the signal in terms of the initial latent image and G. G can be identified with the point spread function for scanning. Using the two-dimensional convolution theorem, $$\overline{S}(\nu_x, \nu_y) = \overline{H}(\nu_x, \nu_y, 0) \overline{G}(\nu_x, \nu_y), \quad (18)$$

where the bars indicate transformed quantities. $\overline{G}$ can be identified with the two-dimensional transfer function for scanning.

A computer program was written for calculating the effective beam profile, the scanning transfer function, and the output signal for reading out a latent image in a transparent photostimulable phosor by raster scanning with a gaussian scanning beam. FIGS. 5–8 illustrate the effective beam shape, or equivalently the two-dimensional point spread function PSF for raster scanning a gaussian beam with increasing exposures $\eta$ (where $\eta$ is defined as $$\frac{aP_o}{\sigma_y^\nu} \Bigg).$$

Figure 5:
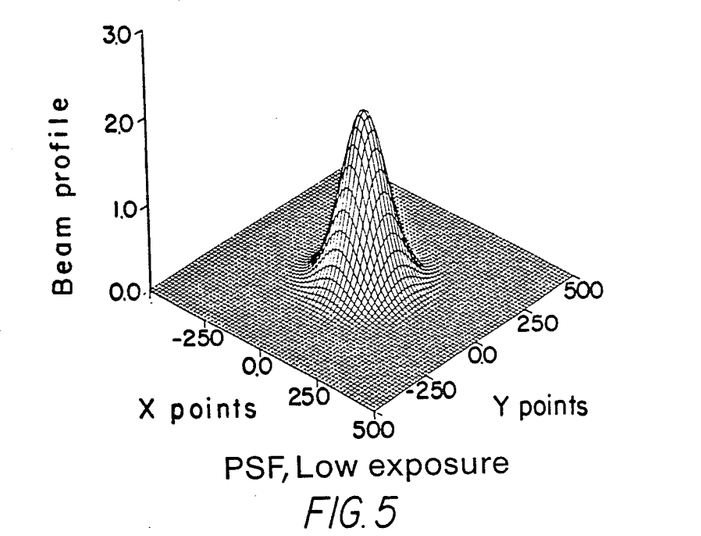
FIGS. 5-8 are two-dimensional plots of "effective beam" profiles in a transparent photostimulable phosphor for increasing beam intensities.
Figure 6:
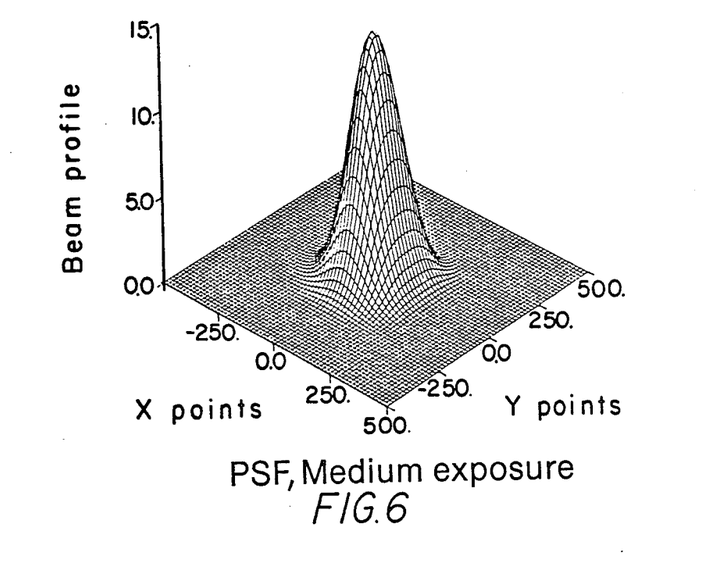
Figure 7:
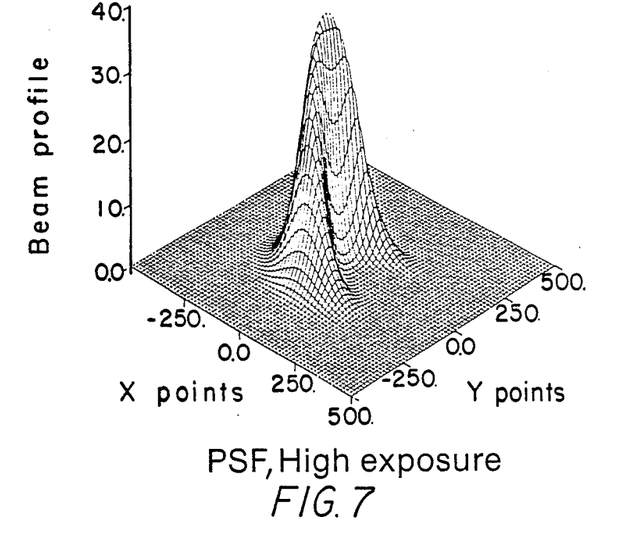
Figure 8:
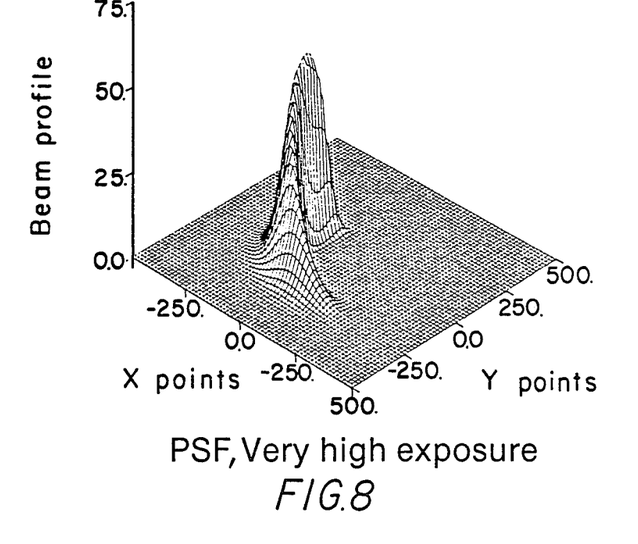

In these calculations, $\sigma_y/p = 0.25$ which corresponds to a $1/e^2$ beam diameter equal to the scan pitch p. The pitch p in the FIGS. 5–8 is 200 μm and the unit of length is 1.0 μm. In FIGS. 5–8, the slow scan direction is in the direction of decreasing y, and the fast scan direction is in the direction of decreasing x. The incident beam is centered on the origin x=0, y=0. FIG. 5 shows the case of low exposure, $\eta = 0.2$. In this example, the effects of pre-exposure are small, and the effective beam intensity profile still closely resembles the actual two-dimensional gaussian intensity profile. In FIG. 6, with $\eta = 2.0$ which corresponds to operating on the ascending part of the curve shown in FIG. 2, the effective beam still resembles a gaussian, but some distortions begin to become evident. FIG. 7 shows the effective beam for an exposure $\eta = 20$. This corresponds to operating at a point on the shoulder of the curve in FIG. 2. At this point, the distortions due to pre-exposure are clearly evident in the effective beam shape. The shape of the effective beam intensity profile can be understood as follows. Near the center of the beam the intensity is high and the effects of pre-exposure are large. Thus the effective beam profile is narrowed and shifted in the direction of beam motion. Near the edges of the beam the intensity is weaker, thus the pre-exposure effects are weaker, and the beam shape parallel to the fast scan direction more closely resembles a gaussian. The presence of the two "wings" evident in the intensity profile in FIG. 7 depends upon the beam size, intensity, and slow scan pitch. For larger beam widths or much higher exposures at the same pitch p, only one "wing" is present. This is evident from FIG. 8, which shows the effective beam profile for $\eta = 200$, corresponding to an operating point far out on the shoulder of the curve shown in FIG. 2. In the example shown in FIG. 8, the beam intensity is so large that the exposure due to the previous scan line (at y = +200 in FIG. 8) has discharged most of the latent image near the current scan line.

Figure 9:
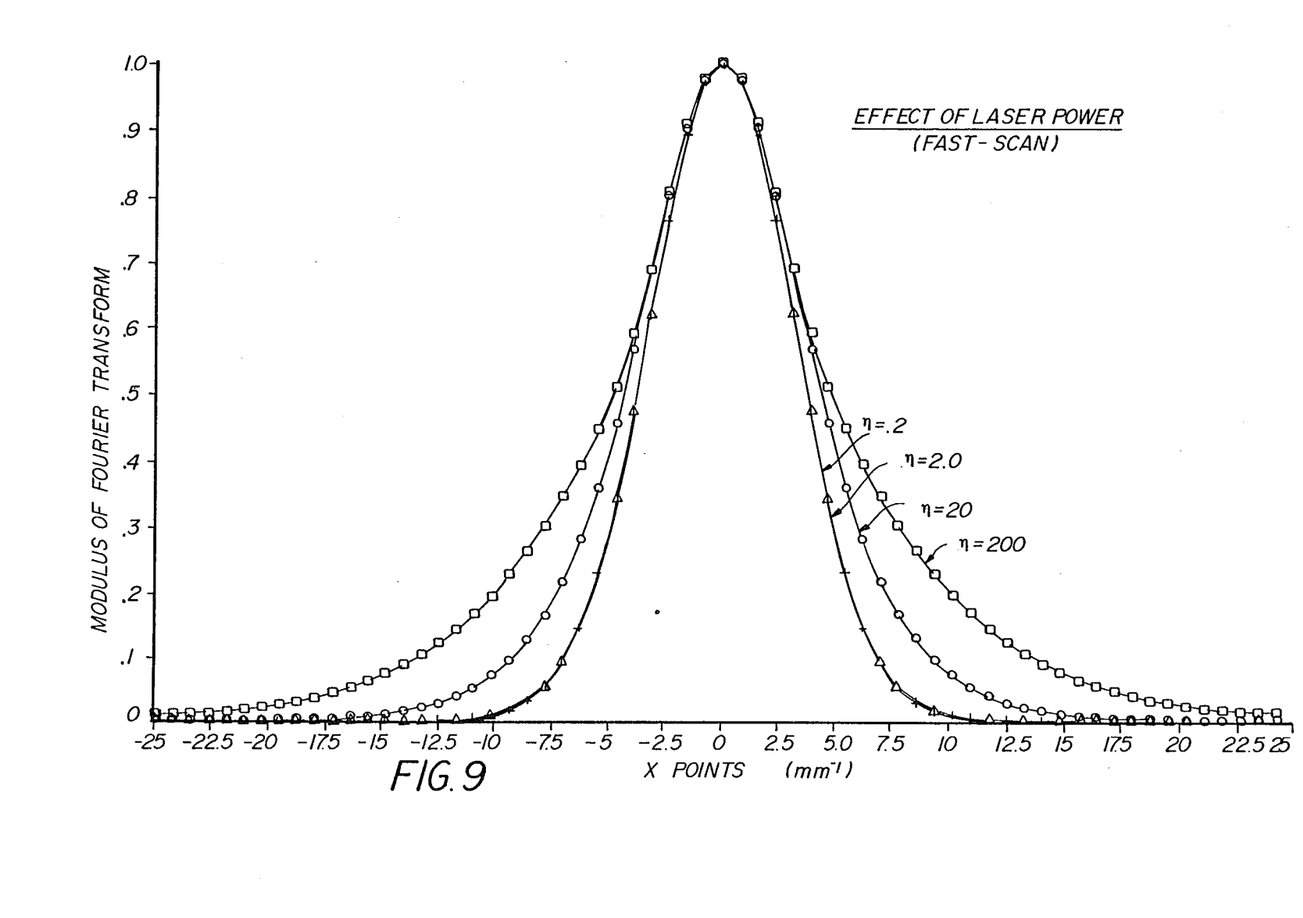
FIGS. 9-14 are plots illustrating the scanning resolution in terms of the spatial frequency response of the effective scanning beam for various beam powers, beam sizes and raster pitches.
Figure 10:
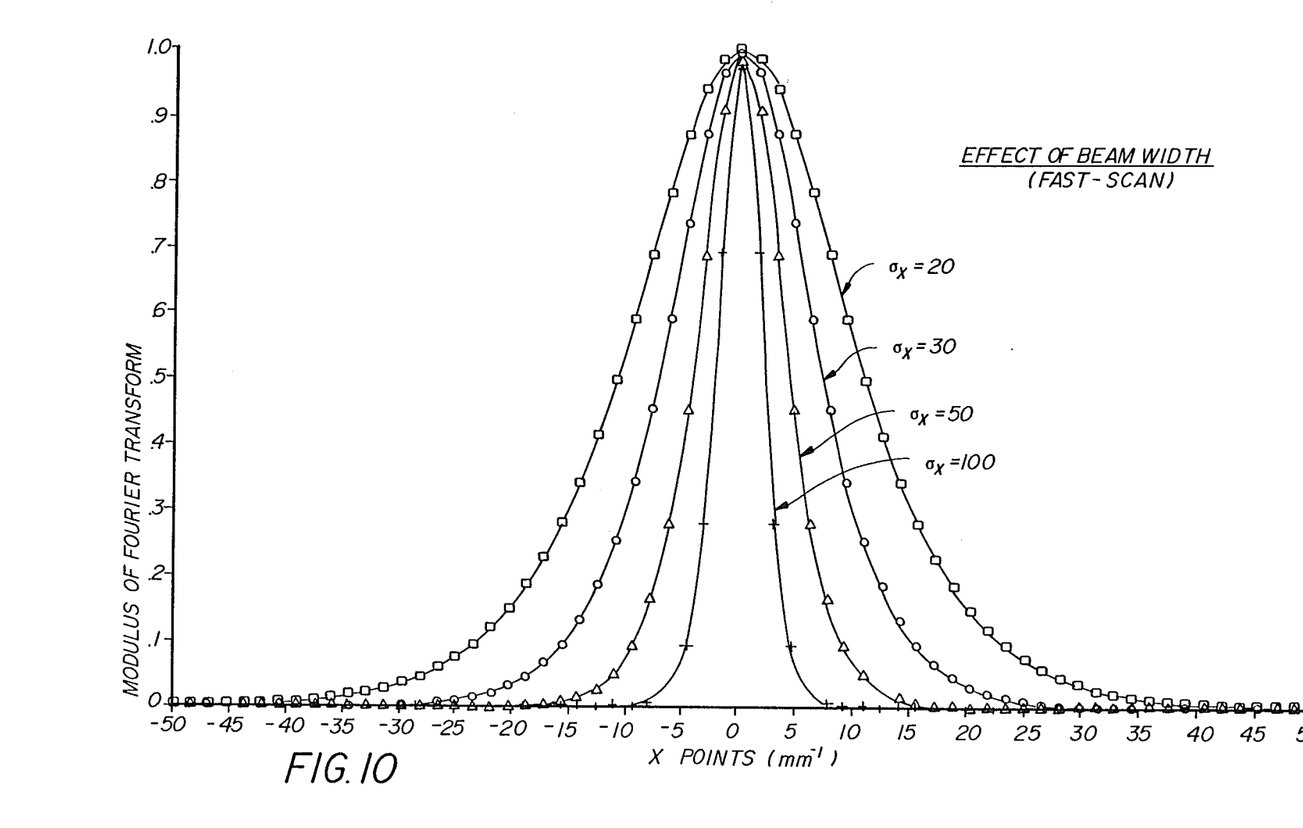
Figure 11:
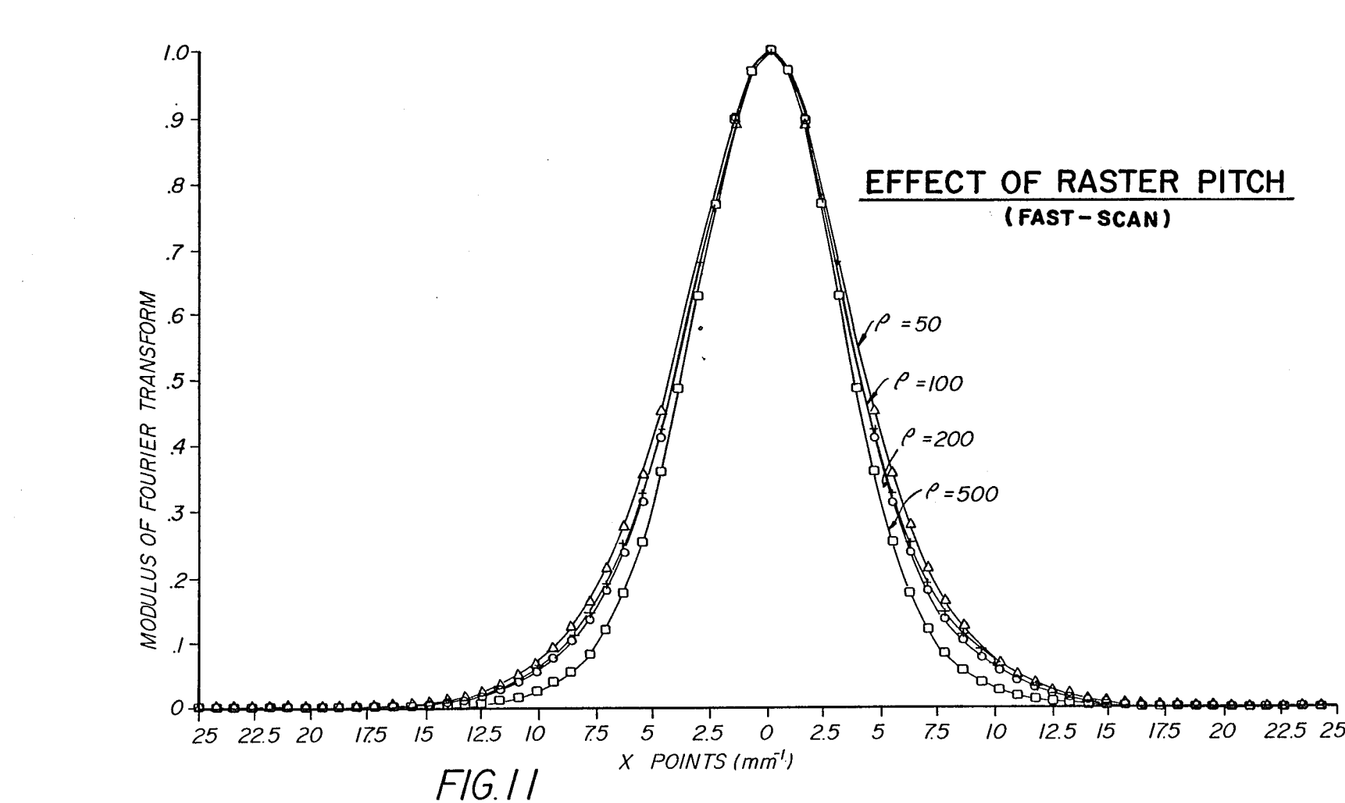

FIGS. 9–14 illustrate the scanning resolution in terms of the spatial frequency response of the effective scanning beam for various beam powers, beam sizes, and raster pitches. In each case, the modulus of the two-dimensional Fourier transform of G (see equation 16) as a function of $\nu_x$ with $\nu_y = 0$ for fast-scan analysis, and $\nu_y$ with $\nu_x = 0$ for slow scan analysis, divided by $\overline{G}$ (0,0) was plotted. These are the modulation transfer functions (MTF's) in the fast and slow scan directions, respectively. FIG. 9 shows the fast-scan MTF for several exposures $\eta$. As seen from FIG. 9, as the exposure $\eta$ is increased, the MTF in the fast direction also increases (i.e. the effective beam width narrows along the direction of beam motion). FIGS. 10 and 11 show the effective beams width and raster pitch on the fast-scan MTF. As seen in the figures, the MTF in the fast scan direction is increased by decreasing the spot size and is not much effected by raster pitch.

Figure 12:
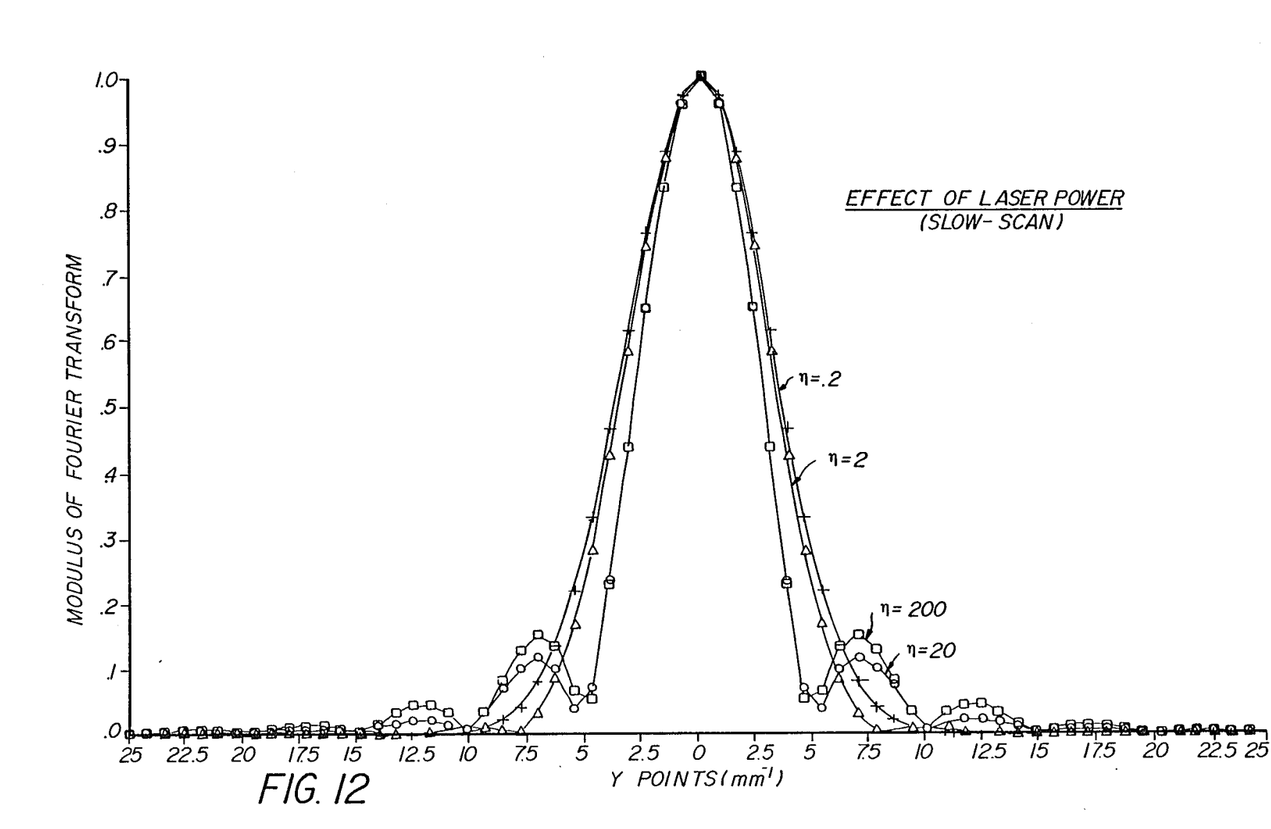

FIG. 12 shows the effect of exposure on the MTF in the slow scan direction. Side lobes appear on the MTF curve at higher frequencies as the exposure $\eta$ is increased. These side lobes are due to the influence of the "wings" of the point spread function discussed above. It should be noted that as the exposure is increased, the MTF in the slow scan direction decreases for the intermediate frequencies. This is opposite to the effect in the fast scan direction.

Figure 13:
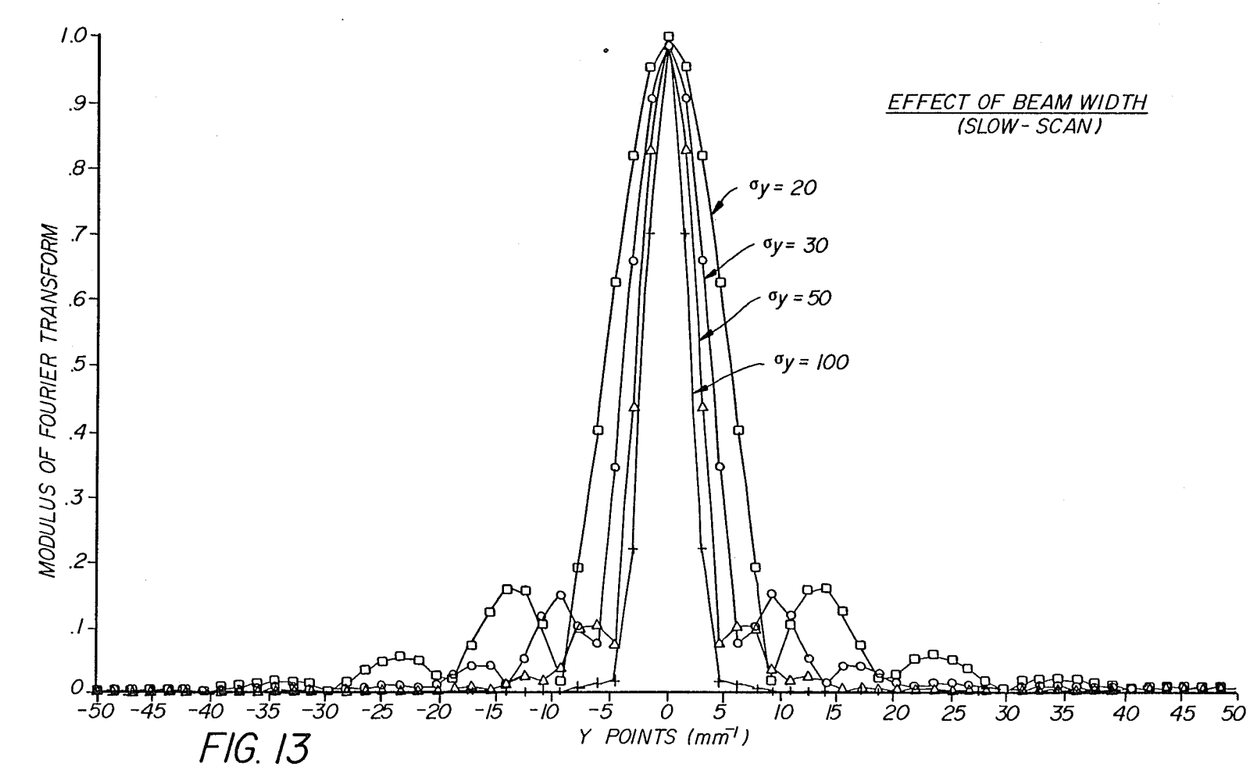
Figure 14:
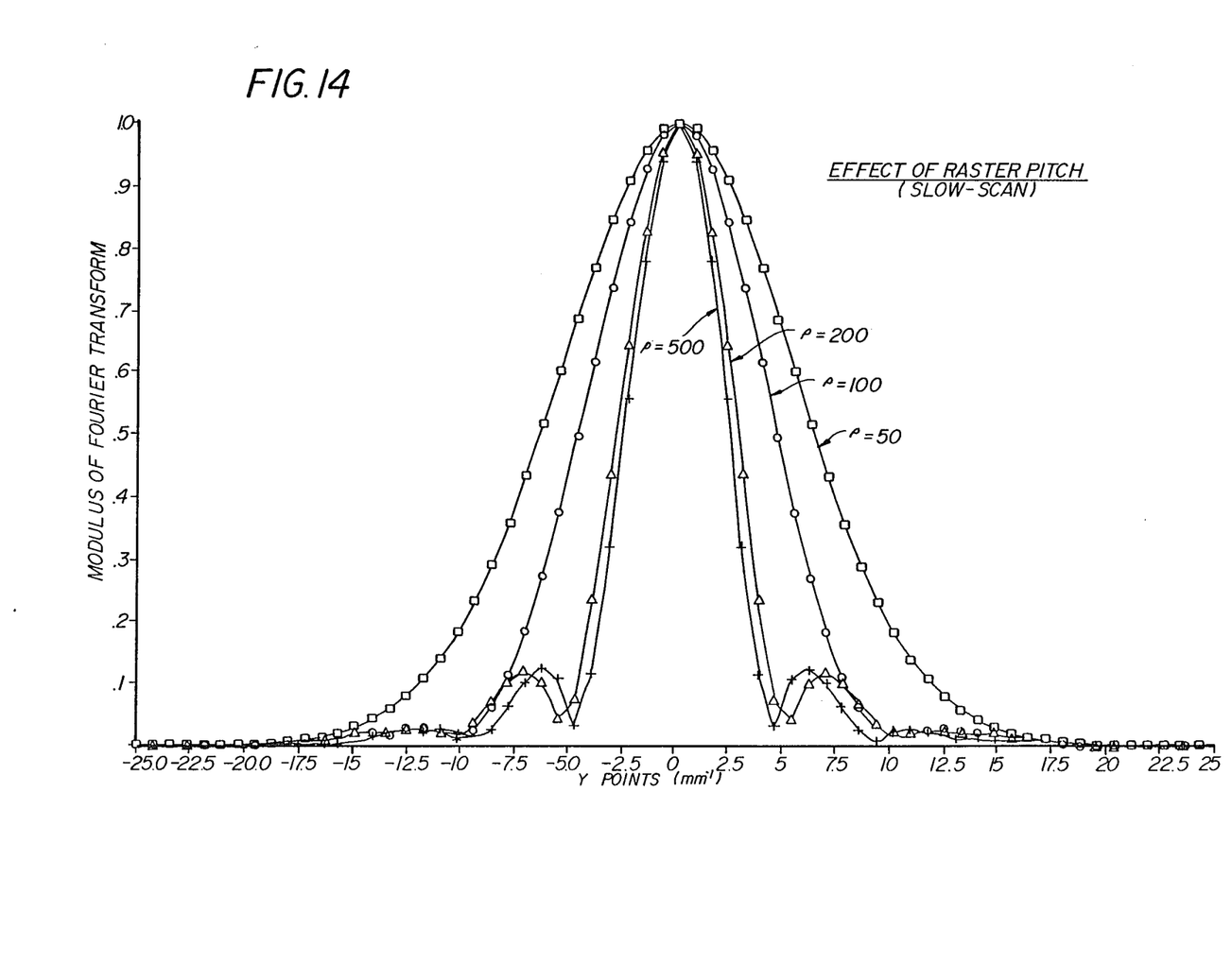

FIGS. 13 and 14 show the effect of beam width and raster pitch on the slow-scan MTF. As seen in FIG. 13, as the spot size $\sigma_y$ is decreased (at constant scan pitch p), the MTF increases. In addition, image structure associated with the previously scanned lines appears. As seen in FIG. 14, as the raster pitch decreases (at constant spot size p), the slow-scan MTF also increases. This may be understood as the sampling of an increasingly narrow strip of "fresh" photostimulable storage phosphor material in each successive scan line.

Figure 15:
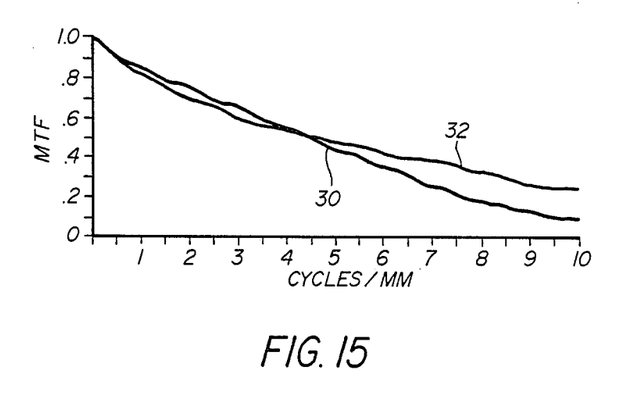
FIG. 15 is a graph of experimental data showing the improved resolution when photostimulable phosphor read out apparatus is operated according to the present invention.

To verify that the self-sharpening effect was being correctly modeled a transparent photostimulable phosphor sheet was exposed with a line source of x-radiation. The latent image of the line was read out by scanning in a direction perpendicular to the line image with the apparatus shown in FIG. 1. The laser source was a Krypton ion laser with a 647 nm line of the Krypton spectrum chosen for scanning. The beam intensity profile was nearly gaussian with a $4\sigma$ diameter of 100 μm and a scanning pitch of 100 μm. The output signal representing the line spread function of the system was transformed to produce the MTF of the system. The image was read out once using a laser power of 14.5 mW, representing operation on the rising portion of the curve shown in FIG. 2. The resulting MTF is plotted as line 30 in FIG. 15. Next, the laser power was doubled to 29 mW, representing operation closer to the shoulder of the curve in FIG. 2, and the identical image was read out and the MTF calculated from the line spread function. The resulting MTF is shown as line 32 in FIG. 15. As predicted by the model, a higher MTF resulted from the higher laser power.

According to a first aspect of the present invention, a transparent photostimulable phosphor sheet is read out with an exposure that is greater than that required to fully discharge the phosphor in less than a scanning beam diameter in the fast scan direction, thereby improving the resolution of the apparatus in the fast scan direction. As was shown above, the higher the exposure above the threshold required to fully discharge the phosphor, the better the resolution in the fast scan direction.

Figure 16:
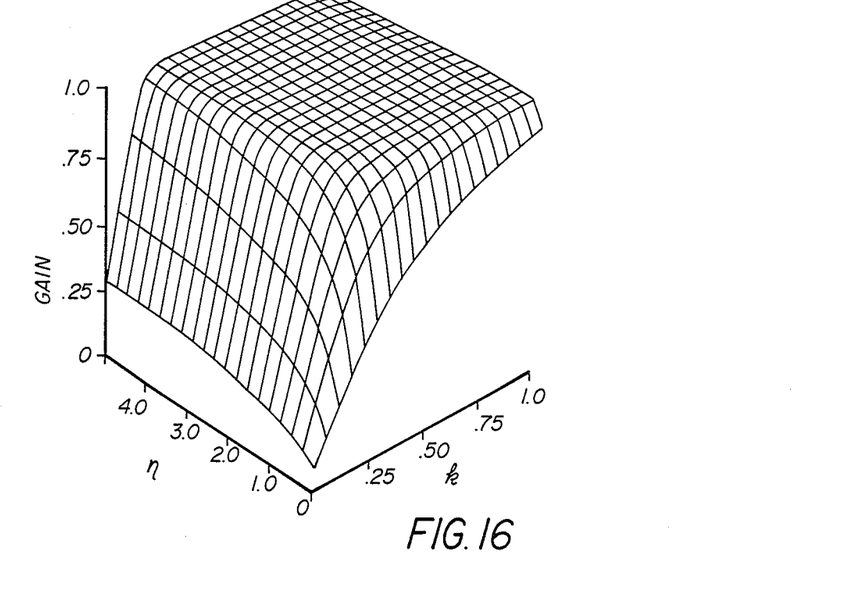
FIG. 16 is a three-dimensional graph of gain versus spot size/raster pitch ratio versus stimulating exposure.
Figure 17:
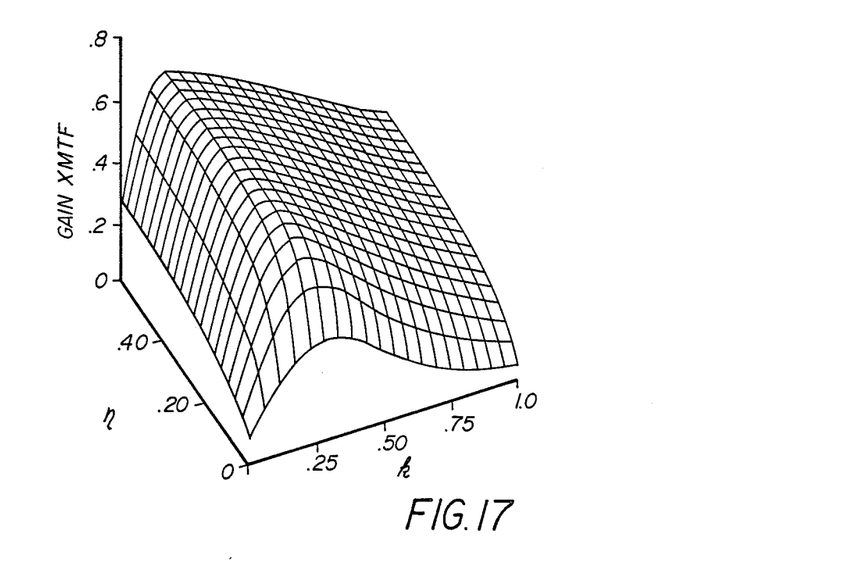
FIG. 17 is a three-dimensional graph of contrast transfer (gain×mtf) versus stimulating exposure versus spot size/raster pitch ratio.

FIG. 16 shows the relative DC signal (called "gain") as a function of the scanning exposure $\eta$ and the ratio k of spot size $\sigma$ to raster pitch p. The plateau in FIG. 16 represents the region of operating parameters wherein the phosphor is fully discharged. Thus, according to the first aspect of the present invention operating parameters are employed that insure operation on this plateau. As seen from FIG. 16, the exposure required to saturate the gain decreases as the spot size increases, for a given raster pitch. However, as spot size is increased, frequency response decreases. FIG. 17 shows the product of the gain and the slow-scan MTF at a fixed frequency $\nu_y$, for a circularly symmetric gaussian beam. From FIG. 17 it is seen that as k ($\sigma_y/p$) is increased for a given exposure, the gain-MTF product (contrast transfer function CTF) at first increases because of the increase in gain. Then the product decreases because of the loss in spatial resolution. Thus, there is an optimal ratio k (in the sense of maximizing the system CTF) in the range of 0.2 to 0.3 depending upon the scan exposure $\eta$. Thus, according to a preferred mode of practicing the present invention, for a raster scanned read out with a gaussian shaped beam, the value of k ($\sigma_y/p$) is between 0.2 and 0.3.

Figure 18:
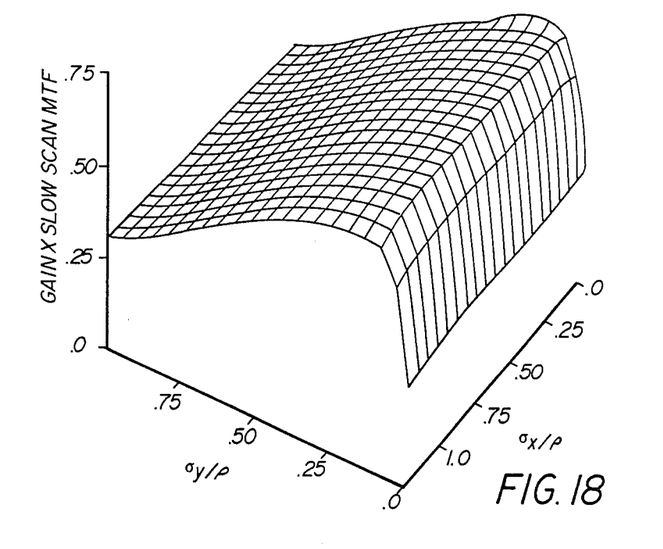
FIG. 18 is a three-dimensional plot of slow scan contrast transfer versus beam shape.
Figure 19:
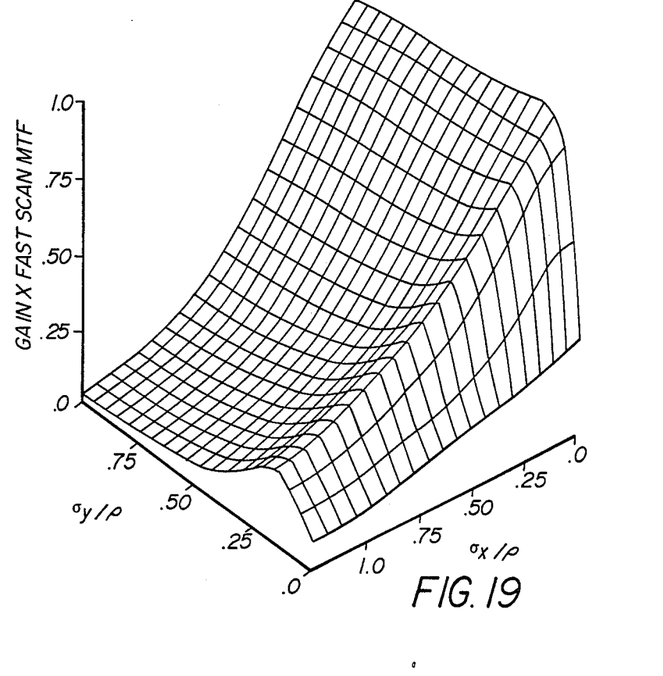
FIG. 19 is a three-dimensional plot of fast scan contrast transfer versus beam shape.

Further gains in the fast scan CTF may be achieved, without sacrificing CTF in the slow scan direction by making the gaussian scanning beam elliptical, with the short axis of the ellipse aligned in the fast scan direction. Such beam shaping is easily achieved using anamorphic optics in the scanning optics. FIG. 18 shows the effect on CTF in the slow scan direction for elliptical beams ($\sigma_x \neq \sigma_y$) and high exposures representing operation on the shoulder portion of the curve in FIG. 2. Similarly, FIG. 19, shows the effects on CTF in the fast scan direction. In these figures, $\sigma_x$ and $\sigma_y$ are varied with the pitch p fixed. For the entire $\sigma_x$ range, it is seen that the CTF in the slow scan direction is maximized when $\sigma_y/p$ is approximately 0.25 as was found for the case of circularly symmetric gaussian beams. It is also seen that the spot size in the slow scan (y) direction affects the CTF in the fast scan (x) direction. Not only does the CTF in the fast scan direction increase at first as $\sigma_y$ is increased, but also, a decrease is noted in the CTF in the fast scan direction as $\sigma_y/p$ is increased above 0.25. It is also noted that the CTF in the fast scan direction continues to increase with decreasing fast scan ($\sigma_x$) spot size.

Industrial Applicability and Advantages

The method of the present invention is useful in medical and industrial x-ray imaging where images are read out of a transparent photostimulable phosphor sheet. In medical x-ray applications, it is usually desirable to employ a relatively thick phosphor sheet to maximize the sensitivity of the x-ray sensitive material, thereby reducing the x-ray dosage requirements for the patient. In such cases the transparency of the phosphor sheet may be achieved using a phosphor in an index matching binder. For industrial x-ray imaging applications, where x-ray dosage may not be a consideration, it is possible to employ a phosphor sheet of more conventional composition, and render it substantially non-scattering to stimulating radiation (i.e. transparent in the sense employed herein) by making the sheet thin relative to the thickness that would be used for medical radiography. The method is advantageous in that the resolution of the images are improved by employing the method of the present invention.

What is claimed is:

1. A method of reading an image from a photostimulable phosphor storage medium of the type that emits an imagewise pattern of radiation in response to stimulation by stimulating radiation comprising the steps of:
   scanning the photostimulable phosphor storage medium with a beam of stimulating radiation of such power and at such a scanning speed effective to completely discharge the photostimulable phosphor in a fraction of the beam spot diameter in the direction of scanning, wherein the effective size of said scanning spot is smaller than the beam spot diameter; and
   collecting and electronically detecting the radiation emitted in response to such scanning to produce an electronic image signal.

2. A method of reading out an image stored in a photostimulable phosphor of the type that emits an imagewise pattern of radiation in response to stimulation by stimulating radiation, the emitted radiation being detected to form an image signal and the photostimulable phosphor being transparent to stimulating radiation, characterized by:
   scanning the photostimulable phosphor with a beam of stimulating radiation of such power and at such scanning speed effective to completely discharge the photostimulable phosphor in a fraction of the beam spot diameter in the direction of scanning, wherein the effective size of said scanning spot is smaller than the beam spot diameter so as to increasing the resolution of the image signal in the scanning direction.

3. The method claimed in claims 1 or 2, wherein said photostimulable phosphor sheet is scanned in a raster pattern with a gaussian beam having a diameter $\sigma_x$ in a fast scan direction and a diameter $\sigma_y$ in a slow scan direction and wherein the ratio of said diameter $\sigma_y$ in the slow scan direction to the pitch p of the raster scan lines is in the range of 0.2 to 0.3.

4. The method claimed in claim 3, wherein said beam of photostimulating radiation has an elliptical gaussian profile with the short axis of the ellipse $\sigma_x$ aligned in the fast scan direction, and the long axis of the ellipse $\sigma_y$ perpendicular to the fast scan direction, wherein the resolution of the image signal is improved in the fast scan direction without loss of signal gain in the slow scan direction.

* * * * *